United States Patent
Okamoto et al.

(10) Patent No.: US 8,611,503 B2
(45) Date of Patent: Dec. 17, 2013

(54) X-RAY WAVEGUIDE

(75) Inventors: Kohei Okamoto, Yokohama (JP);
Atsushi Komoto, Moriya (JP); Wataru Kubo, Inagi (JP); Hirokatsu Miyata, Hadano (JP); Takashi Noma, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 13/112,099

(22) Filed: May 20, 2011

(65) Prior Publication Data

US 2011/0299662 A1 Dec. 8, 2011

(30) Foreign Application Priority Data

Jun. 2, 2010 (JP) .................................. 2010-127338
Apr. 28, 2011 (JP) .................................. 2011-101307

(51) Int. Cl.
*G21K 1/00* (2006.01)

(52) U.S. Cl.
USPC ......................................................... 378/145

(58) Field of Classification Search
USPC ................................................. 378/119, 145
See application file for complete search history.

(56) References Cited

U.S. PATENT DOCUMENTS

2011/0129065 A1   6/2011   Komoto et al. .................. 378/84

FOREIGN PATENT DOCUMENTS

JP         3-146909 A        6/1991

OTHER PUBLICATIONS

I.R. Prudnikov, "X-Ray waveguides Based on Bragg Scattering of Multilayers", *Physical Review B*, vol. 67, Issue 23, p. 233303-1 through 233303-4 (2003).

*Primary Examiner* — Jurie Yun
(74) *Attorney, Agent, or Firm* — Fitzpatrick, Cella, Harper & Scinto

(57) ABSTRACT

An X-ray waveguide which: shows a small propagation loss of an X-ray; does not deteriorate owing to oxidation; and can be easily produced is realized with an X-ray waveguide, including: a core for guiding an X-ray in such a wavelength band that the real part of refractive index of materials is 1 or less; and a cladding for confining the X-ray in the core, in which: the cladding has a one-dimensional periodic structure consisting of at least two materials having different real parts of refractive index; one of the materials is inorganic one, and another one of materials is any of an organic material, a gas, or vacuum; and the core and the cladding are formed so that the critical angle for total reflection at the interface between the core and the cladding is smaller than a Bragg angle depending on the periodicity of the one-dimensional periodic structure.

5 Claims, 4 Drawing Sheets

X-RAY WAVEGUIDE

BACKGROUND OF THE INVENTION

1. Field of the Invention

The present invention relates to an X-ray waveguide, in particular, an X-ray waveguide used in an X-ray optical system, for example, in an X-ray analysis technology, an X-ray imaging technology, or an X-ray exposure technology.

2. Description of the Related Art

When an electromagnetic wave having a short wavelength of several tens of nanometers or less is dealt with, a difference in refractive index for any such electromagnetic wave between different materials is extremely small, specifically, $10^{-4}$ or less, and thus, for example, a critical angle for total reflection becomes extremely smaller. In view of the foregoing, a large-scale spatial optical system is usually used for controlling such an electromagnetic wave including an X-ray. Among the main components of which the spatial optical system is formed, multilayer mirrors obtained by alternately laminating materials having different refractive indices are playing various roles such as beam shaping, spot size conversion, and wavelength selection.

A conventional X-ray waveguide such as a polycapillary propagates, in contrast to such mainstream spatial optical system, an X-ray by confining the X-ray in itself. Researches have been recently conducted on X-ray waveguides propagating X-ray by confining the X-ray in a thin film or a multilayer film, with a view to reducing the size and improving the performance of an optical system.

Specifically, researches have been conducted on, for example, thin-film waveguides of such a constitution that a waveguiding layer is interposed between two layers of one-dimensional periodic structures (see Physical Review B, Volume 67, Issue 23, p. 233303 (2003)), and an X-ray fiber of such a constitution that a vacuum core is surrounded with a cladding obtained by alternately laminating a heavy element and a light element (see Japanese Patent Application Laid-Open No. H03-146909).

SUMMARY OF THE INVENTION

In Japanese Patent Application Laid-Open No. H03-146909, however, it is difficult to produce a core region having such a small diameter that an independent waveguide mode of an X-ray is formed or to uniformly form a laminated film of a cladding on the outer periphery of the fiber. In addition, since an inorganic material that absorbs the X-ray to a large extent is used in the cladding, the propagation loss of the X-ray increases. Further, the oxidation of the inorganic material may cause the deterioration or structural change of the waveguide.

Further, Physical Review B, Volume 67, Issue 23, p. 233303 (2003), which is an investigation based on calculation, adopts such a model that Ni and C are used as components of a multilayer film serving as the cladding. Accordingly, the propagation loss of the X-ray due to Ni is large. In addition, a labor and time is required for the step of laminating those materials to show sufficient reflectance.

The present invention has been made in view of such conventional problems as described above, and an object of the present invention is to provide an X-ray waveguide which: shows a small propagation loss of an X-ray; does not deteriorate owing to oxidation; and can be easily produced.

In one aspect of the present invention, an X-ray waveguide is provided, which includes: a core for guiding an X-ray in such a wavelength band that the real part of refractive index of materials is 1 or less; and the cladding for confining the X-ray in the core, in which: the cladding has a one-dimensional periodic structure consisting of at least two different materials having different real parts of refractive index; one of the materials is inorganic one, and another one of materials is any of an organic material, a gas, or vacuum. material; and the core and the cladding are formed so that a critical angle for total reflection at the interface between the core and the cladding is smaller than a Bragg angle depending on the periodicity of the one-dimensional periodic structure.

Further features of the present invention will become apparent from the following description of exemplary embodiments with reference to the attached drawings.

DESCRIPTION OF THE EMBODIMENTS

Hereinafter, the present invention is described in detail.

The term "X-ray" as used in the present invention refers to electromagnetic waves in such a wavelength band that the refractive index real part of a material is 1 or less. Specifically, the term "X-ray" as used in the present invention refers to electromagnetic waves, each of which having a wavelength of 100 nm or less including extreme ultraviolet light (EUV light). Regarding the electromagnetic wave having such short wavelength, the following fact has been known. Since the electromagnetic wave has so high a frequency that an electron in the outermost shell of a material cannot respond to the frequency, the real part of the refractive index of the material for an X-ray is smaller than 1 unlike the frequency band of an electromagnetic wave (visible light or infrared light) having a wavelength longer than that of ultraviolet light. As represented in the following formula (1), such refractive index n of a material for an X-ray is generally represented by using a decrement δ of a real part from 1 and an imaginary part β' related to absorption.

[Math. 1]

$$n = 1 - \delta - 1\beta' = n' - 1\beta' \quad (1)$$

Since the δ is proportional to an electron density $\rho_e$ of the material, the real part of the refractive index reduces as the electron density of the material increases. In addition, the refractive index real part n' is 1−δ. Further, the $\rho_e$ is proportional to an atomic density $\rho_a$ and an atomic number Z. As described above, the refractive index of a material for an X-ray is represented in terms of a complex number. In the specification, the real part of the complex number is referred to as a "refractive index real part" or a "real part of the refractive index," and the imaginary part of the complex number is referred to as a "refractive index imaginary part" or an "imaginary part of the refractive index."

A case where a refractive index real part for an X-ray becomes maximum is the case where the X-ray propagates in a vacuum. Under a general environment, however, the refractive index real parts of air for nearly all materials except gases become maximum. In the specification, the term "material" is applied to a vacuum as well. In the present invention, at least two materials having different refractive index real parts can be interpreted as two or more kinds of materials having different electron densities in many cases. The minimum unit structure that forms a periodic structure is referred to as a "structure element" in the specification.

The present invention is characterized in that at least one kind of material out of all materials of which a one-dimensional periodic structure that forms a cladding is formed is an organic material, and at least another one kind of material out of all materials is a continuous inorganic material.

The propagation loss of an X-ray due to absorption can be reduced because one kind of the materials of which the one-dimensional periodic structure is formed is an organic material that absorbs the X-ray to a small extent.

In addition, the term "continuous inorganic material" refers to a material in which inorganic elements such as Si and Ti are bonded in a film fashion by a covalent bond through O or the like such as $SiO_2$, $TiO_2$, or $SnO_2$, or a material in which atoms are bonded in a film fashion by a metal bond such as Au or Pt. Such continuous inorganic material can improve the strength of the one-dimensional periodic structure itself. Further, the use of an oxide such as $SiO_2$ or $TiO_2$ as the inorganic material can obviate the deterioration or structural change of an X-ray waveguide of the present invention due to oxidation, thereby resulting in improved durability. A one-dimensional periodic structure of such a constitution that the inorganic material and the organic material are alternately laminated in a one-dimensional direction is a multilayer film in the present invention. When the one-dimensional periodic structure is a multilayer film, while the inorganic material in the structure elements that form the periodic structure is continuously formed in the in-plane direction of the multilayer film, it is not needed to be continuous between the respective structure elements.

A method of laminating the inorganic material that is an oxide is, for example, vapor deposition or a sputtering method.

Further, the multilayer film formed of such material is, for example, a lamellar film as a meso structured film of a lamellar structure produced by employing a sol-gel process. The term "lamellar film" as used herein refers to a mesostructured film having a lamellar structure. The term "mesostructured film" refers to an organic-inorganic hybrid material film formed by the self-assembly of a surfactant. Mesostructured films having various meso-scale period of the periodic structureicities are available, and among those, a mesostructured film of such a lamellar structure that sheets (thin films) of an organic material and an inorganic material are laminated is suitably used in the present invention. Representative examples of the inorganic material of such mesostructured film include oxides such as $SiO_2$, $TiO_2$, $SnO_2$, and $ZrO_2$. Such mesostructured film of the lamellar structure can be formed on a substrate by an approach such as the sol-gel process. The period of the periodic structure of the mesostructured film of the lamellar structure can be appropriately adjusted to a desired value depending on, for example, the kind and concentration of the surfactant to be used, and reaction conditions. Since the mesostructured film of the lamellar structure forms the one-dimensional periodic structure in a self-organizing fashion in one step, the time and labor of a production step for the film can be markedly curtailed.

In the present invention, the cladding is preferably formed of a multilayer film formed of a mesostructured film of the lamellar structure serving as a meso structure.

In addition, the number of periods of the multilayer film obtained by periodically laminating the films is preferably 20 or more. In the present invention, the mesostructured film is a film of periodic structure having a period of the periodic structure of 2 nm or more and 50 nm or less.

The lamellar structure is a layered structure formed of two different kinds of materials, and the two kinds of materials are formed of an inorganic material mainly formed of an inorganic component and an organic material mainly formed of an organic component. The inorganic material mainly formed of the inorganic component and the organic material mainly formed of the organic component may be bonded to each other as required. A product in which the materials are bonded to each other is specifically, for example, a mesostructure prepared from a siloxane compound to which an alkyl group is bonded.

A material for the inorganic material mainly formed of the inorganic component, which is not particularly limited, is, for example, an inorganic oxide from the viewpoint of produceability and such a viewpoint that the periodic structure is formed of materials having different refractive index real parts. Examples of the inorganic oxide include silicon oxide, tin oxide, zirconia oxide, titanium oxide, niobium oxide, tantalum oxide, aluminum oxide, tungsten oxide, hafnium oxide, and zinc oxide. The surface of a wall part may be modified as necessary. For example, the surface of the wall part may be modified with a hydrophobic molecule for inhibiting the adsorption of water.

The organic material mainly formed of the organic component, which is not particularly limited, is, for example, a surfactant or a material in which a site having a function of forming a molecular assembly is bonded to a material of which a wall part is formed or a precursor for the material of which a wall part is formed. Examples of the surfactant include ionic and nonionic surfactants. The ionic surfactant is, for example, a halide salt of a trimethylalkylammonium ion. The chain length of the alkyl chain is, for example, 10 to 22 in terms of a carbon number. Examples of the nonionic surfactant include surfactants, each of which is containing polyethylene glycol as a hydrophilic group. Specific examples of the surfactants, each of which is containing polyethylene glycol as a hydrophilic group include a polyethylene glycol alkyl ether and a polyethylene glycol-polypropylene glycol-polyethylene glycol block copolymer. The chain length of the alkyl chain of the polyethylene glycol alkyl ether is, for example, 10 to 22 in terms of a carbon number, and the number of repetitions of the polyethylene glycol is, for example, 2 to 50. The period of the periodic structure can be changed by changing the hydrophobic group or hydrophilic group. In general, the period of the periodic structure can be extended by making a hydrophobic group or hydrophilic group large. The material mainly formed of the organic component may contain water, an organic solvent, a salt, or the like as required, or as a result of a material to be used or a step. Examples of the organic solvent include an alcohol, ether, and a hydrocarbon.

Next, a method of producing the mesostructured film is described.

Although the method of producing the mesostructured film is not particularly limited, the film is produced by, for example, adding a precursor for an inorganic oxide to a solution of an amphipathic material (especially a surfactant) that functions as an assembly to perform film formation so that a reaction for producing the inorganic oxide may be advanced.

In addition, an additive for adjusting a period of the periodic structure as well as the surfactant may be added. The additive for adjusting a period of the periodic structure is, for example, a hydrophobic material. Examples of the hydrophobic material include alkanes and aromatic compounds free of hydrophilic groups. The hydrophobic material is specifically, for example, octane.

Examples of the precursor for the inorganic oxide include an alkoxide and a chloride of silicon or a metal element. More specific examples thereof include an alkoxide and a chloride of Si, Sn, Zr, Ti, Nb, Ta, Al, W, Hf, or Zn. Examples of the alkoxide include a methoxide, an ethoxide, a propoxide. The alkoxides may partly be substituted with an alkyl group.

Examples of the film-forming method include a dip coating method, a spin coating method, and a hydrothermal synthesis method.

Further, special examples of the one-dimensional periodic structure in the present invention include a mesoporous film and a mesoporous film whose pores are filled with an organic material and the like. Each of those mesoporous films is such that pores or pores filled with the organic material are placed in an inorganic material in a two- or three-dimensional direction. However, any such film serves as the one-dimensional periodic structure when attention is paid to a refractive index or density at which an average refractive index has a periodic distribution in a one-dimensional direction depending on a material out of which, and a condition under which, the film is produced. In particular, when the inside of each pore is filled with a gas such as air or is evacuated to a vacuum, a difference in refractive index between the materials of which any such film is formed can be increased. In addition, the propagation loss of an X-ray can be reduced. Hereinafter, such mesoporous films are described.

(A) Mesoporous Film whose Pores are Hollow

The mesoporous film is a porous material having a pore diameter of 2 to 50 nm, and a material for a wall part, which is not particularly limited, is, for example, an inorganic oxide in terms of produceability. Examples of the inorganic oxide include silicon oxide, tin oxide, zirconia oxide, titanium oxide, niobium oxide, tantalum oxide, aluminum oxide, tungsten oxide, hafnium oxide, and zinc oxide. The surface of the wall part may be modified as necessary. For example, the surface may be modified with a hydrophobic molecule for inhibiting adsorption of water.

Although a method of preparing the mesoporous film is not particularly limited, the film can be prepared by, for example, the following method. A precursor for the inorganic oxide is added to a solution of an amphipathic material whose assembly functions as a template to perform film formation so that a reaction for producing the inorganic oxide may be advanced. After that, template molecules are removed so that the porous material may be obtained.

The amphipathic material, which is not particularly limited, is suitably a surfactant. Examples of the surfactant molecule include ionic and nonionic surfactants. The ionic surfactant is, for example, a halide salt of a trimethylalkylammonium ion. The chain length of the alkyl chain is, for example, 10 to 22 in terms of a carbon number. Examples of the nonionic surfactant include surfactants, each of which is containing polyethylene glycol as a hydrophilic group. Specific examples of the surfactants, each of which is containing polyethylene glycol as a hydrophilic group include a polyethylene glycol alkyl ether and a polyethylene glycol-polypropylene glycol-polyethylene glycol block copolymer. The chain length of the alkyl chain of the polyethylene glycol alkyl ether is, for example, 10 to 22 in terms of a carbon number, and the number of repetitions of the polyethylene glycol is, for example, 2 to 50. The period of the periodic structure can be changed by changing the hydrophobic group or hydrophilic group. In general, a pore diameter can be extended by making a hydrophobic group or hydrophilic group large. In addition, an additive for adjusting a period of the periodic structure as well as the surfactant may be added. The additive for adjusting a period of the periodic structure is, for example, a hydrophobic material. Examples of the hydrophobic material include alkanes and aromatic compounds free of hydrophilic groups. The hydrophobic material is specifically, for example, octane.

Examples of the precursor for the inorganic oxide include an alkoxide and a chloride of silicon or a metal element. More specific examples thereof include an alkoxide and a chloride of Si, Sn, Zr, Ti, Nb, Ta, Al, W, Hf, or Zn. Examples of the alkoxide include a methoxide, an ethoxide, a propoxide. The alkoxides may partly be substituted with an alkyl group.

Examples of the film-forming method include a dip coating method, a spin coating method, and a hydrothermal synthesis method. Examples of the method of removing the template molecules include calcination, extraction, ultraviolet irradiation, and ozonation.

(B) Mesoporous Film whose Pores are Mainly Filled with Organic Compound

Any one of the same materials as those described in the section (A) can be used as a material for a wall part. The material with which each pore is filled is not particularly limited as long as the material is mainly formed of an organic compound. The term "mainly" means that a volume ratio of the organic compound to the material is 50% or more. The organic compound is, for example, a surfactant or a material in which a site having a function of forming a molecular assembly is bonded to the material of which a wall part is formed or a precursor for the material of which a wall part is formed. Examples of the surfactant include the surfactants described in the section (A). In addition, examples of the material in which the site having a function of forming a molecular assembly is bonded to the material of which a wall part is formed or the precursor for the material of which a wall part is formed include an alkoxysilane having an alkyl group and an oligosiloxane compound having an alkyl group. The chain length of the alkyl chain is, for example, 10 to 22 in terms of a carbon number.

The inside of each pore may contain water, an organic solvent, a salt, or the like as required, or as a result of a material to be used or a step. Examples of the organic solvent include an alcohol, ether, and a hydrocarbon.

A method of preparing the mesoporous film whose pores are mainly filled with the organic compound, which is not particularly limited, is, for example, a step before the template removal of the method of preparing the mesoporous film described in the section (A).

A material of which a core is formed is desirably air, an organic material such as a polymethyl methacrylate resin (PMMA) or polydimethylsiloxane (PDMS), or a material having a light electron density, in other words, a large refractive index real part and a low absorption loss, such as carbon (C) or boron (B). In addition, the core is not limited to one formed of one kind of uniform material, and even a material whose core itself has a periodic structure such as a multilayer film can be used to form the X-ray waveguide of the present invention.

Since the behavior of the X-ray basically follows Maxwell's equations, the reflection and refraction of an X-ray occur at an interface between two materials having different refractive index real parts. As long as the propagation angle of the X-ray at the interface between the two materials having different refractive index real parts measured from the interface is larger than a critical angle for total reflection at the interface, the reflection and refraction repeatedly occur at an interface between the respective layers even when a periodic structure is formed of these materials. As a result, multiple interference occurs in the periodic structure.

In particular, in the present invention, Bragg reflection occurs as a result of multiple interference in the cladding. An X-ray is confined in the core by the Bragg reflection. When a relationship represented by the following formula (2) is satisfied between a critical angle for total reflection $\theta_c$ at an interface between the cladding and the core, and a Bragg angle $\theta_B$ of the periodic structure, an X-ray that propagates at an angle around the Bragg angle undergoes Bragg reflection as a result of multiple interference in the periodic structure, and hence the X-ray can be confined in the core.

[Math. 2]

$$\theta_C < \theta_B \qquad (2)$$

In the formula, $\theta_c$ represents an angle measured from an interface between a material having a relatively large refractive index real part (a relatively low electron density) and a material having a relatively small refractive index real part (a relatively high electron density) upon incidence of an X-ray from the former material on the interface.

The Bragg angle $\theta_B$ of the one-dimensional periodic structure is a Bragg angle depending on the periodicity of the multilayer film. In addition, the Bragg angle $\theta_B$ of the one-dimensional periodic structure, i.e., the multilayer film is roughly represented by the following formula (3) when the period of the one-dimensional periodic structure as the cladding is represented by d and the average refractive index real part of the one-dimensional periodic structure as the cladding is represented by $n_{avg}$.

[Math. 3]

$$\theta_B \approx \frac{180}{\pi} \arcsin\left(\frac{1}{n_{avg}} m \frac{\lambda}{2d}\right) \qquad (3)$$

In the formula, m represents a natural number, d represents the period of the periodic structure of the one-dimensional periodic structure, and λ represents the wavelength of an X-ray.

The Bragg reflection holds completely true when the periodic structure infinitely continues. Accordingly, the left and right sides of the formula (3) are not connected to each other with a complete equal sign, and as the number of periods of the one-dimensional periodic structure as an actual periodic structure increases, the angle for high reflectance caused by the multiple interference in the one-dimensional periodic structure approaches the right side of the formula (3). The number of periods of the one-dimensional periodic structure in the X-ray waveguide of the present invention is set to about 20 periods or more. In the specification, reflection caused by the multiple interference of an X-ray in such realistic periodic structure that does not infinitely continue is also referred to as "Bragg reflection," and the angle at which the X-ray is reflected from a direction parallel to a film interface is referred to as a "Bragg angle." And it's preferable that the Bragg angle should be determined by the X-ray diffraction measurement or the like in reality.

As a result, the Bragg reflection, and since the one-dimensional periodic structure of the present invention is regarded as a one-dimensional photonic crystal, a photonic band gap (stop band) effect exists. In the case of the one-dimensional periodic structure, a lowest-order photonic band gap is identical to first-order (m=1 in math [3]) Bragg reflection caused by the periodicity of the periodic structure in the direction in which the periodicity exists. In other words, reflection caused by the lowest-order photonic band gap is the first-order Bragg reflection.

Figure 1:
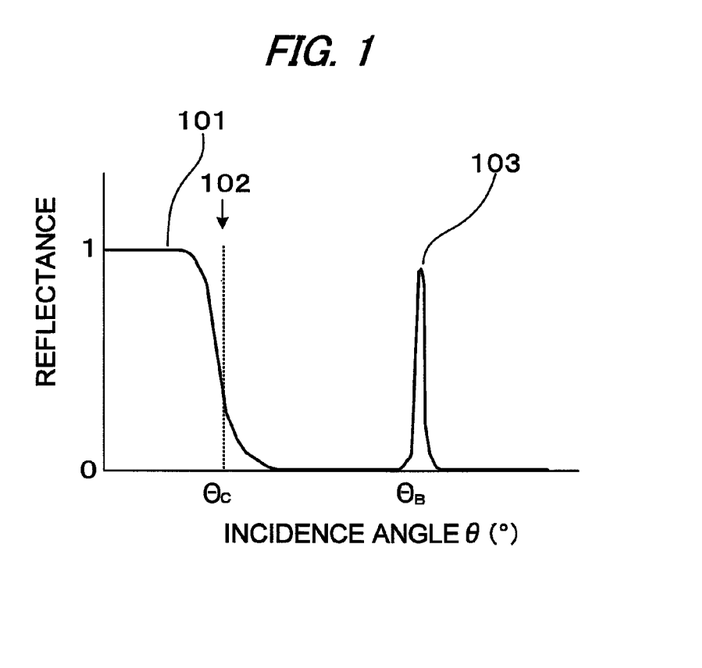
FIG. 1 is a view illustrating a reflectance.
Figure 3:
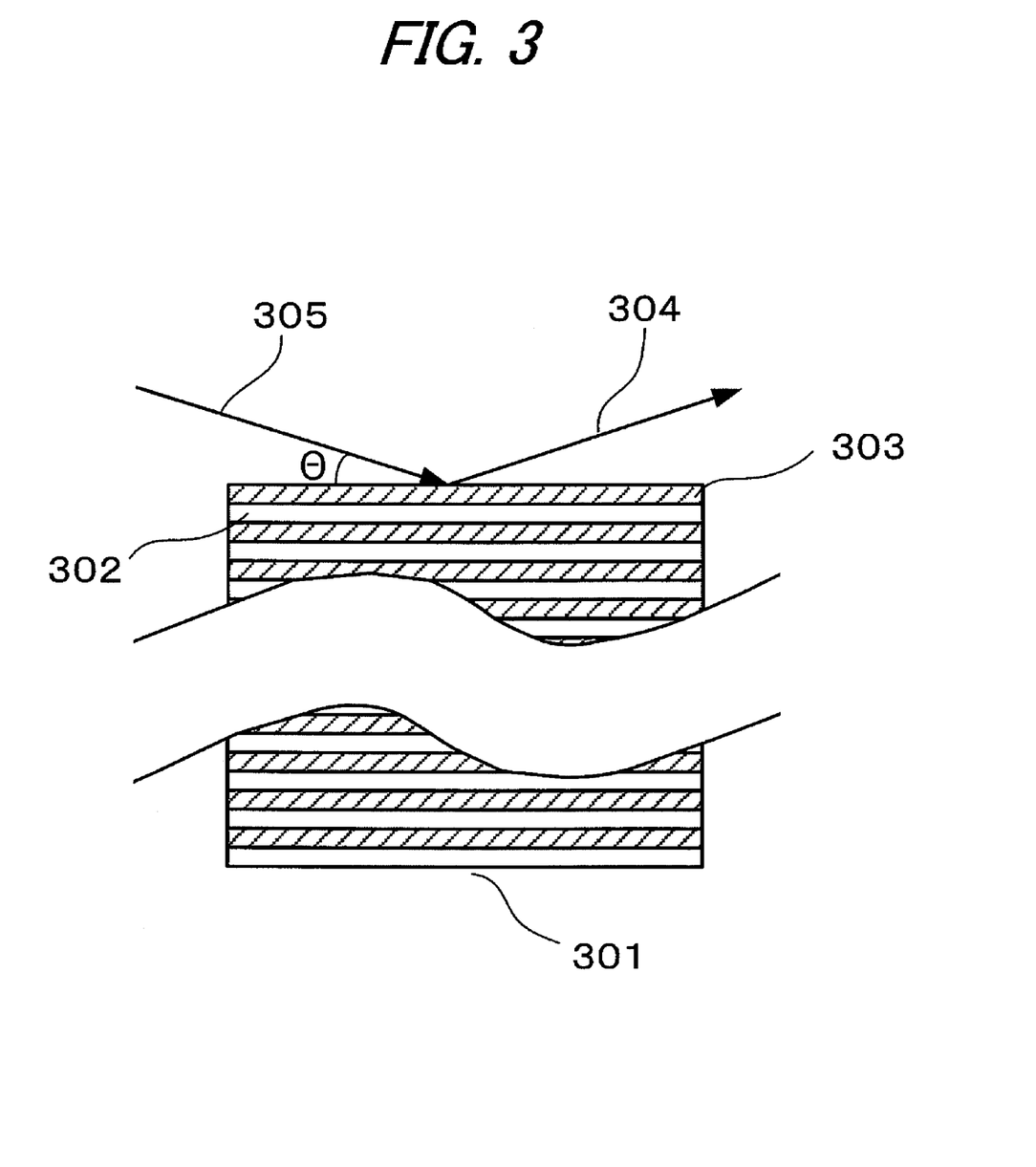
FIG. 3 is a view illustrating a state of the reflection of X-ray by a one-dimensional periodic structure.

For example, FIG. 3 is a schematic view illustrating an X-ray 304 having a specific single wavelength, and the X-ray is incident upon a cladding 301 as the one-dimensional periodic structure of which the X-ray waveguide of the present invention is formed at an incidence angle θ(°) and then reflected. The incidence angle is an angle measured from a direction parallel to each interface of the one-dimensional periodic structure. The cladding 301 as the one-dimensional periodic structure is a one-dimensional periodic structure formed as a multilayer film by alternately laminating 50 layers each of an organic material 303 and an inorganic material 302. FIG. 1 illustrates the incidence angle dependence of reflectance of X-ray base on the ratio of the intensity of the reflected X-ray 305 to that of the incident X-ray 304. In FIG. 1, a angle range for total reflection 101, a critical angle for total reflection 102, and a peak 103 are shown.

In FIG. 1, $\theta_C$ represents a critical angle for total reflection at an interface between the cladding and air. When an X-ray is incident at an incidence angle equal to or smaller than the $\theta_C$, a high reflectance 101 is obtained by virtue of total reflection. When the incidence angle is equal to or larger than the $\theta_C$, the X-ray undergoes nearly no reflection. However, a high reflectance is obtained at the Bragg angle $\theta_B$, based on the periodicity of the cladding, and appears as the peak 103 on the graph. The peak 103 has a width in terms of an angle, and the width corresponds to a photonic band gap in angle presented by the periodic structure that forms the cladding.

Figure 2:
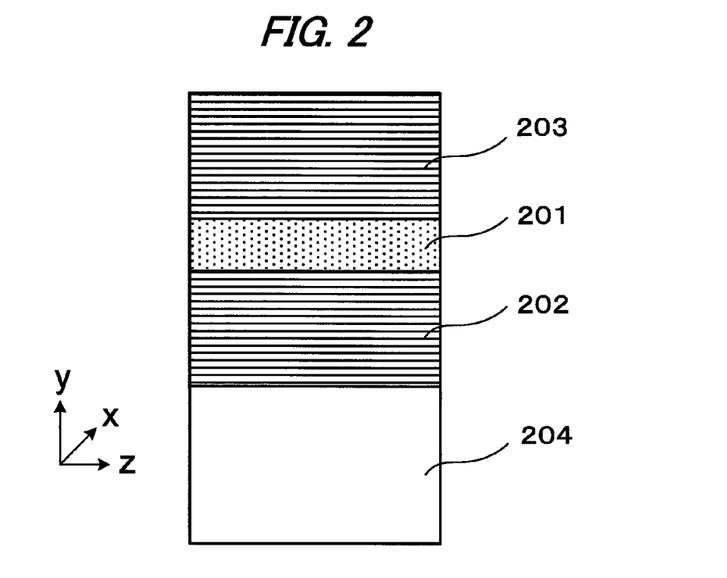
FIG. 2 is a view illustrating an X-ray waveguide of Example 1 of the present invention.

The cladding of the X-ray waveguide of the present invention is formed of such one-dimensional periodic structure as described above, and an X-ray is confined in the core by the cladding. As illustrated in FIG. 2, in the case of a constitution in which a core is interposed between two claddings, each of which is serving as such one-dimensional periodic structure, an X-ray having a specific wavelength introduced into the core causes multiple reflection between both claddings. As a result, the X-ray undergoes Bragg reflection (is reflected by a photonic band gap) to form a waveguide mode in the core. The propagation constant of the waveguide mode depends on the periodicity of the one-dimensional periodic structure as each cladding. The phase of the waveguide mode is also affected by the periodicity of the one-dimensional periodic structure, and is hence matched in the direction perpendicular to a guiding direction of X-ray of waveguide mode and having a high periodicity. The phrase "phase of the waveguide mode is matched" as used in the present invention refers not only to that a phase difference of the electromagnetic field of waveguide mode over the area of core in a plane perpendicular to the guiding direction of X-ray of waveguide mode is zero but also to that the phase difference of the electromagnetic field of the waveguide mode periodically changes between −π and +π over the area in correspondence with the spatial refractive index distribution of the periodic structure.

When the Bragg angle $\theta_B$ of the one-dimensional periodic structure is larger than the critical angle for total reflection $\theta_C$ at the interface between the cladding and the core, only a waveguide mode resulting only from the vicinity of the Bragg angle of the one-dimensional periodic structure (angle corresponding to the photonic band gap) can be independently formed in the core as illustrated in FIG. 1. In contrast, when the Bragg angle of the one-dimensional periodic structure is smaller than the critical angle for total reflection at the interface between the cladding and the core, multiple waveguide modes resulting from a wide angle range equal to or smaller than the critical angle for total reflection at the interface between the cladding and the core are formed. Accordingly, the waveguide mode resulting from the Bragg angle is hardly discriminated from those waveguide modes.

The critical angle for total reflection at the interface between the core and the cladding in the present invention is smaller than the Bragg angle of the one-dimensional periodic structure, provided that the Bragg angle $\theta_B$ exists on the basis of a structure parameter and a physical property parameter in correspondence with the positive integer m as represented by the formula (3). In the case of the constitution of the X-ray waveguide of the present invention, a Bragg angle that contributes to an actual waveguide mode is determined in relation to the physical properties and thickness of the core, and furthermore, to the structures and characteristics of the cladding and substrate. Accordingly, the effective propagation angle of the lowest-order waveguide mode confined in the core does not necessarily coincide with the vicinity of the Bragg angle for m=1. Therefore, in the present invention, a Bragg angle under such a condition that the critical angle for total reflection at the interface between the core and the cladding is smaller than the Bragg angle affects the effective propagation angle of the lowest-order waveguide mode confined in the core.

Example 1

FIG. 2 is a view illustrating Example 1 of the X-ray waveguide of the present invention. A lamellar film 202 formed as a multilayer film to serve as a cladding is formed on an Si substrate 204. Then, PDMS having a thickness of about 32 nm is formed as a core 201 on the film by spin coating. Further, a lamellar film 203 is formed on the core. The inorganic material of the lamellar films is $SiO_2$. The lamellar films 202 and 203 of this example are produced by the following method.

(a) Preparation of Solution

A mesostructured film having a lamellar structure is prepared by a spin coating method. A precursor solution is prepared by dissolving n-decyltrimethoxysilane, tetramethoxysilane, water, and hydrochloric acid in a tetrahydrofuran solvent, and stirring the resultant at 25° C. for 3 hours. The mixing ratio (molar ratio) of n-decyltrimethoxysilane, tetramethoxysilane, water, hydrochloric acid, and tetrahydrofuran is set to 1:4:19:0.01:20.

(b) Film Formation

After the substrate has been washed, coating is performed with a spin coating apparatus under the conditions of 3,000 rpm and 10 seconds. At this time, a temperature is 25° C. and a relative humidity is 40%. After having been formed, a film is held in a thermo-hygrostat at 25° C. and a relative humidity of 50% for 4 weeks.

(c) Evaluation

The mesostructured film is subjected to X-ray diffraction analysis in a Bragg-Brentano geometry. As a result, it is confirmed that the mesostructured film has high order in the normal direction of the substrate surface and its plane spacing is 3.56 nm.

Figure 5:
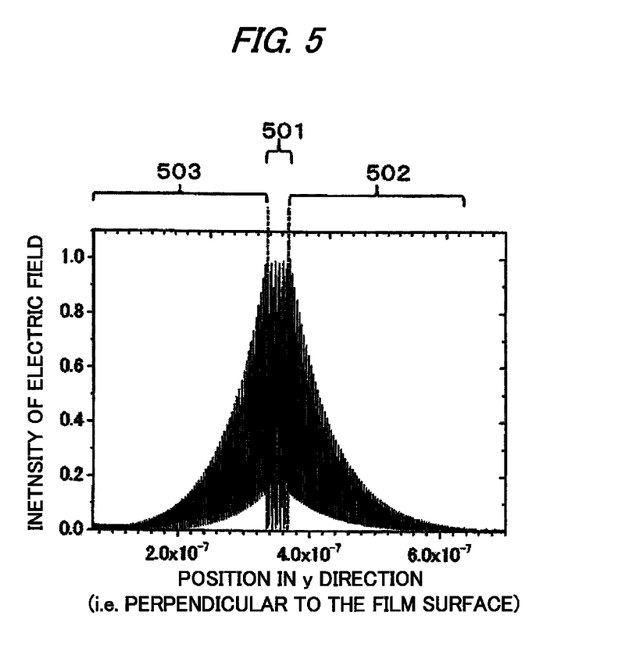
FIG. 5 is a view illustrating the dependence of intensity distribution of electric field of the waveguide mode in the X-ray waveguide of Example 1 of the present invention on the position in the direction perpendicular to the film surface.

The X-ray waveguide of this example is of such a structure that an X-ray is confined in the core 201 by Bragg reflection, in other words, a photonic band gap effect exerted as a result of the multiple interference of the X-ray in the lamellar films. The direction in which the X-ray propagates is a z direction in the figure. FIG. 5 is a graph illustrating the intensity distribution of electric field of the lowest-order waveguide mode present in the X-ray waveguide in this example. The energy of the X-ray by calculation is 12.4 keV. Here, an effective propagation angle $\theta'$ (°) in the specification is an angle from a direction parallel to a film surface, and is represented by the following formula (4) with a wave vector (propagation constant) $k_z$ in the propagation direction of a waveguide mode and a wave vector $k_0$ in a vacuum of the waveguide mode.

[Math. 4]

$$\tilde{\theta} = \frac{180}{\pi}\arccos\left(\frac{k_z}{k_0}\right) \quad (4)$$

Figure 6:
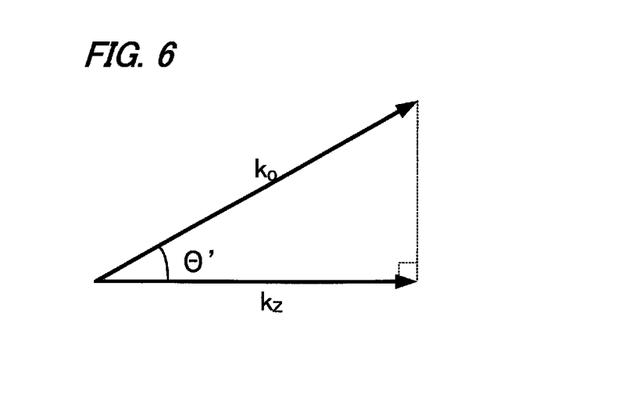
FIG. 6 is a view illustrating the wave vectors of fundamental wave of the waveguide mode.

Since the $k_z$ is constant at an interface between the respective layers by virtue of a condition of continuity, as illustrated in FIG. 6, the effective propagation angle $\theta'$ (°) represents an angle defined between the propagation constant $k_z$ of the fundamental wave of the waveguide mode and the wave vector $k_0$ in a vacuum of the fundamental wave at which the fundamental wave of the waveguide mode propagates in a vacuum. The angle can be considered to approximately represent the angle at which the fundamental wave of the waveguide mode propagates in the core.

In the graph of FIG. 5, a region 501 corresponds to the core in the X-ray waveguide of this example, and regions 502 and 503 correspond to the claddings in the X-ray waveguide of this example. The effective propagation angle of the waveguide mode corresponds to the vicinity of a Bragg angle of about 0.82°. Only a waveguide mode resulting from the Bragg angle can exist by being confined in an additionally wide angle region, and hence no other waveguide mode can be present in a specific angle range. As a result, the waveguide mode is an independent waveguide mode in a wide angle range, and can propagate an X-ray without mixing with any other mode. In addition, the phase of the waveguide mode is basically matched because the phase is affected by the Bragg reflection at each lamellar film. In addition, as can be seen from the graph, the waveguide mode is strongly confined in the region of the core 501.

Example 2

Figure 4:
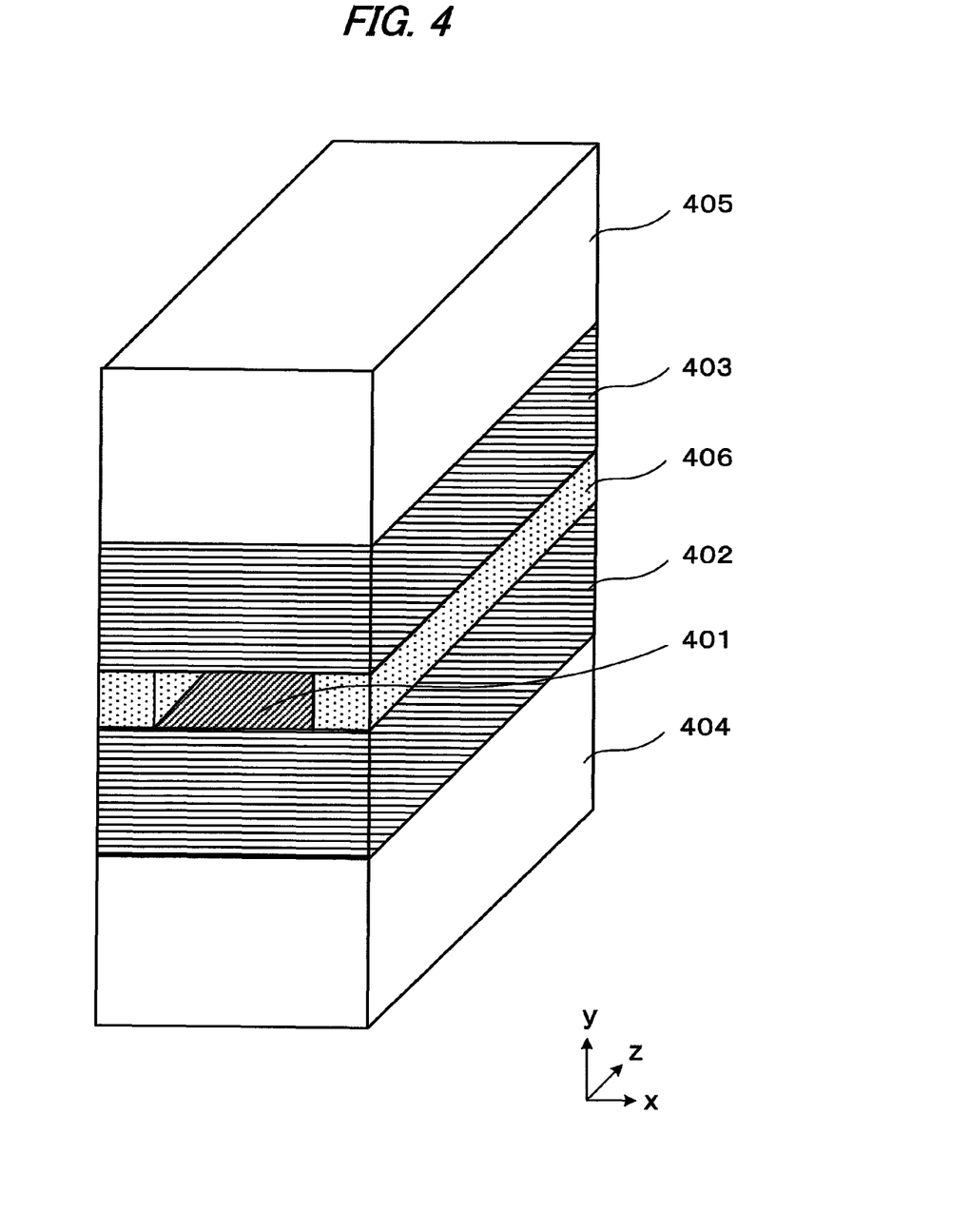
FIG. 4 is a view illustrating an X-ray waveguide of Example 2 of the present invention.

FIG. 4 is a view illustrating Example 2 of the X-ray waveguide of the present invention. The claddings of this example are the films of a mesoporous silica (mesoporous material) whose inorganic material is silica ($SiO_2$), and the inside of each pore of the film is filled with air. The X-ray of waveguide mode propagates in a z direction in the figure. The X-ray waveguide of this example is such that the film of the mesoporous silica is formed as a cladding 402 or 403. However, a core 401 is formed of air. The mesoporous silica film is of a structure having a one-dimensional periodicity in a y direction in the figure, and the period of the structure is about 6 nm. A lamellar film is formed on each of Si substrates 404 and 405, and Au pattern of about 50 nm height is made on the surface of each Si substrates by sputtering, lithography, and etching process. After that, both the Si substrates are attached to each other so that the respective mesoporous silica films may be opposite to each other. The presence of the Au film 406 provides a 50-nm air gap between the two claddings of mesoporous silica film, which is the core 401. The Au part of this example exists only for forming the air gap serving as the core.

Formed in the X-ray waveguide of this example is a waveguide mode having an effective propagation angle that coincides with the vicinity of a Bragg angle of about 0.47° of Bragg reflection resulting from the periodicity of each mesoporous silica film.

The X-ray waveguide of the present invention can be utilized in the field of X-ray optics technologies such as X-ray optical systems for controlling X-ray from, for example, a synchrotron, or a part for use in an X-ray imaging technologies, an X-ray exposure technologies, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-127338, filed Jun. 2, 2010, and No. 2011-101307, filed Apr. 28, 2011, which are hereby incorporated by reference herein in their entirety.

What is claimed is:

1. An X-ray waveguide, comprising:
a core for guiding an X-ray; and
a cladding for confining the X-ray in the core,
wherein:
the cladding has a one-dimensional periodic structure containing materials having different real parts of refractive index;
the materials include one of an organic material, a gas, and a vacuum, and an inorganic material; and
the core and the cladding are formed so that a critical angle for total reflection at an interface between the core and the cladding is smaller than a Bragg angle depending on a periodicity of the one-dimensional periodic structure.

2. The X-ray waveguide according to claim 1, wherein:
the one-dimensional periodic structure contains a mesoporous material having a one-dimensional periodicity in a direction perpendicular to the interface between the cladding and the core; and
the mesoporous material is perforated with pores that elongate in a guiding direction of X-ray.

3. The X-ray waveguide according to claim 1, wherein the inorganic material comprises an oxide.

4. The X-ray waveguide according to claim 1, wherein the one-dimensional periodic structure includes a mesostructured film of lamellar structure.

5. The X-ray waveguide according to claim 1, wherein the number of periods of the one-dimensional periodic structure is 20 or more.

* * * * *